(12) United States Patent
Thibadeau, Sr. et al.

(10) Patent No.: US 11,265,165 B2
(45) Date of Patent: Mar. 1, 2022

(54) INITIAL PROVISIONING THROUGH SHARED PROOFS OF KNOWLEDGE AND CROWDSOURCED IDENTIFICATION

(71) Applicant: Antique Books, Inc., Pittsburgh, PA (US)

(72) Inventors: Robert H. Thibadeau, Sr., Pittsburgh, PA (US); Justin D. Donnell, Verona, PA (US)

(73) Assignee: Antique Books, Inc., Pittsburgh, PA (US)

( * ) Notice: Subject to any disclaimer, the term of this patent is extended or adjusted under 35 U.S.C. 154(b) by 15 days.

(21) Appl. No.: 15/575,648

(22) PCT Filed: May 23, 2016

(86) PCT No.: PCT/US2016/033793
§ 371 (c)(1),
(2) Date: Nov. 20, 2017

(87) PCT Pub. No.: WO2016/191376
PCT Pub. Date: Dec. 1, 2016

(65) Prior Publication Data
US 2018/0123793 A1  May 3, 2018

Related U.S. Application Data

(60) Provisional application No. 62/165,251, filed on May 22, 2015.

(51) Int. Cl.
*H04L 9/32* (2006.01)
*H04L 29/06* (2006.01)
(Continued)

(52) U.S. Cl.
CPC .......... *H04L 9/3218* (2013.01); *H04L 9/3263* (2013.01); *H04L 63/083* (2013.01);
(Continued)

(58) Field of Classification Search
CPC ... H04L 9/3218; H04L 9/3263; H04L 63/083; H04L 63/1441; H04W 12/06; H04W 12/12; H04W 12/069
(Continued)

(56) References Cited

U.S. PATENT DOCUMENTS 5,559,961 A    9/1996  Blonder
5,931,948 A    8/1999  Morisawa et al.
(Continued)

FOREIGN PATENT DOCUMENTS

EP    1601153 A2    11/2005
EP    2085908 A2    8/2009
(Continued)

OTHER PUBLICATIONS

Author Unknown, "Human Verification," retrieved on Apr. 22, 2015 from graphicdesign.stackexchange.com, 1 page.
(Continued)

*Primary Examiner* — Aravind K Moorthy
(74) *Attorney, Agent, or Firm* — Withrow & Terranova, PLLC (57) ABSTRACT

Systems and methods for initial provisioning through shared Proofs of Knowledge (PoKs) and crowdsourced identification are provided. In some embodiments, a method of sharing a PoK between a first Relying Party (RP) server and a second RP server includes receiving, by the first RP server, a request from a client device by a user for sharing the PoK. The method also includes causing, by the first RP server, the PoK to be provided to the client device and receiving, by the second RP server, a request from the client device to use the shared PoK for authentication of the user. In this way, the user may be provided additional convenience by allowing the reuse of the shared PoK. Also, depending on the number (Continued)

of RP servers that accept the shared PoK, the user may also be provided a degree of crowdsourced identification.

16 Claims, 8 Drawing Sheets

(51) Int. Cl.
   *H04W 12/12* (2021.01)
   *H04W 12/069* (2021.01)
(52) U.S. Cl.
   CPC ....... *H04L 63/1441* (2013.01); *H04W 12/069* (2021.01); *H04W 12/12* (2013.01)
(58) Field of Classification Search
   USPC ........................................................ 713/168
   See application file for complete search history.

(56) References Cited

U.S. PATENT DOCUMENTS

| | | | |
|---|---|---|---|
| 6,011,848 A * | 1/2000 | Kanda ................ | G06Q 20/401 380/28 |
| 6,209,104 B1 | 3/2001 | Jalili | |
| 6,249,868 B1 | 6/2001 | Sherman et al. | |
| 6,411,283 B1 | 6/2002 | Murphy | |
| 6,658,328 B1 | 12/2003 | Alrabady et al. | |
| 6,934,838 B1 * | 8/2005 | Boyce ................ | H04L 63/0407 713/156 |
| 6,934,860 B1 | 8/2005 | Goldstein | |
| 6,957,344 B1 * | 10/2005 | Goldshlag ............ | H04N 7/173 380/211 |
| 6,983,065 B1 | 1/2006 | Akgul et al. | |
| 7,243,239 B2 | 7/2007 | Kirovski et al. | |
| 7,370,351 B1 | 5/2008 | Ramachandran et al. | |
| 7,490,237 B1 * | 2/2009 | Morais ................ | H04L 63/08 713/166 |
| 7,734,930 B2 | 6/2010 | Kirovski et al. | |
| 8,015,563 B2 | 9/2011 | Araujo, Jr. et al. | |
| 8,024,775 B2 | 9/2011 | Xu et al. | |
| 8,086,507 B1 * | 12/2011 | Alder ................ | G06Q 20/108 705/30 |
| 8,132,017 B1 * | 3/2012 | Lewis ................ | G06F 21/45 380/255 |
| 8,155,622 B1 | 4/2012 | Moshenberg et al. | |
| 8,191,126 B2 | 5/2012 | Raghavan | |
| 8,244,799 B1 * | 8/2012 | Salusky ............. | H04L 63/1416 709/203 |
| 8,353,016 B1 | 1/2013 | Pravetz et al. | |
| 8,392,975 B1 | 3/2013 | Raghunath | |
| 8,627,421 B1 | 1/2014 | Bowers et al. | |
| 8,667,560 B2 | 3/2014 | Albisu | |
| 8,682,802 B1 | 3/2014 | Kannanari | |
| 8,813,183 B2 | 8/2014 | Thibadeau et al. | |
| 8,813,247 B1 | 8/2014 | Alten | |
| 8,832,804 B1 | 9/2014 | Casey et al. | |
| 8,881,251 B1 | 11/2014 | Hilger | |
| 8,918,851 B1 | 12/2014 | Iannamico | |
| 8,966,268 B2 | 2/2015 | Marien | |
| 9,282,098 B1 * | 3/2016 | Hitchcock .......... | H04L 63/0884 |
| 9,300,659 B2 | 3/2016 | Thibadeau, Sr. et al. | |
| 9,323,435 B2 | 4/2016 | Thibadeau, Sr. et al. | |
| 9,490,981 B2 | 11/2016 | Thibadeau, Sr. et al. | |
| 9,497,186 B2 | 11/2016 | Thibadeau, Sr. et al. | |
| 9,582,106 B2 | 2/2017 | Thibadeau, Sr. et al. | |
| 9,600,643 B2 | 3/2017 | Strode | |
| 10,423,775 B1 * | 9/2019 | Kane-Parry ............ | G06F 21/46 |
| 2002/0029341 A1 | 3/2002 | Juels et al. | |
| 2002/0080123 A1 | 6/2002 | Kennedy et al. | |
| 2002/0184225 A1 | 12/2002 | Ghukasyan | |
| 2002/0196274 A1 | 12/2002 | Comfort et al. | |
| 2003/0147536 A1 | 8/2003 | Andivahis et al. | |
| 2004/0010721 A1 | 1/2004 | Kirovski et al. | |
| 2004/0030934 A1 | 2/2004 | Mizoguchi et al. | |
| 2004/0034801 A1 | 2/2004 | Jaeger | |
| 2004/0049697 A1 | 3/2004 | Edwards, Jr. et al. | |
| 2004/0073795 A1 * | 4/2004 | Jablon ................ | H04W 12/50 713/171 |
| 2004/0073809 A1 | 4/2004 | Wing Keong | |
| 2004/0095384 A1 | 5/2004 | Avni et al. | |
| 2004/0223619 A1 * | 11/2004 | Jablon ................ | H04L 9/0844 380/277 |
| 2004/0230843 A1 | 11/2004 | Jansen | |
| 2005/0119979 A1 | 6/2005 | Murashita et al. | |
| 2006/0198517 A1 * | 9/2006 | Cameron ............ | G06F 21/445 380/44 |
| 2006/0206717 A1 | 9/2006 | Holt et al. | |
| 2006/0244735 A1 | 11/2006 | Wilson | |
| 2007/0005962 A1 | 1/2007 | Baker | |
| 2007/0022299 A1 | 1/2007 | Yoshimura | |
| 2007/0067618 A1 * | 3/2007 | Sandhu ................ | H04L 9/302 713/155 |
| 2007/0067631 A1 | 3/2007 | Westhoff | |
| 2007/0071243 A1 * | 3/2007 | Nanda ................ | H04L 9/3218 380/277 |
| 2007/0097096 A1 | 5/2007 | Rosenberg | |
| 2007/0150842 A1 | 6/2007 | Chaudhri et al. | |
| 2007/0229216 A1 | 10/2007 | Yasuda | |
| 2007/0234041 A1 * | 10/2007 | Lakshmeshwar ..... | H04L 63/062 713/156 |
| 2007/0258594 A1 * | 11/2007 | Sandhu ................ | H04L 9/3218 380/277 |
| 2008/0000969 A1 * | 1/2008 | Salomonsen .......... | G07C 13/00 235/386 |
| 2008/0010678 A1 | 1/2008 | Burdette et al. | |
| 2008/0022129 A1 | 1/2008 | Durham et al. | |
| 2008/0133917 A1 * | 6/2008 | Jeong ................ | H04L 9/3218 713/175 |
| 2008/0163055 A1 | 7/2008 | Ganz et al. | |
| 2008/0201578 A1 | 8/2008 | Drake | |
| 2008/0263361 A1 | 10/2008 | Dutta et al. | |
| 2009/0089869 A1 | 4/2009 | Varghese | |
| 2009/0106134 A1 | 4/2009 | Royyuru | |
| 2009/0158424 A1 | 6/2009 | Yang | |
| 2009/0160800 A1 | 6/2009 | Liu et al. | |
| 2009/0199002 A1 | 8/2009 | Erickson | |
| 2009/0202153 A1 | 8/2009 | Cortopassi et al. | |
| 2009/0210368 A1 * | 8/2009 | Deo ................ | G06K 9/6267 706/20 |
| 2009/0210716 A1 * | 8/2009 | Chen ................ | H04L 9/3073 713/176 |
| 2009/0313693 A1 | 12/2009 | Rogers | |
| 2010/0023756 A1 * | 1/2010 | Ben-Itzhak ......... | H04L 63/0823 713/156 |
| 2010/0043062 A1 | 2/2010 | Alexander et al. | |
| 2010/0146128 A1 | 6/2010 | Kulkarni et al. | |
| 2010/0169958 A1 | 7/2010 | Werner et al. | |
| 2010/0207721 A1 | 8/2010 | Nakajima et al. | |
| 2010/0223326 A1 | 9/2010 | Noldus et al. | |
| 2010/0223456 A1 * | 9/2010 | Schneider .......... | H04L 63/0428 713/152 |
| 2010/0275196 A1 * | 10/2010 | Peterson ............ | G06F 9/4401 717/173 |
| 2010/0329464 A1 * | 12/2010 | Kerschbaum ........ | G06Q 10/087 380/279 |
| 2011/0013031 A1 | 1/2011 | Miyasako | |
| 2011/0055585 A1 | 3/2011 | Lee | |
| 2011/0072263 A1 * | 3/2011 | Bishop ................ | G06F 21/36 713/168 |
| 2011/0078775 A1 * | 3/2011 | Yan ................ | G06F 21/57 726/6 |
| 2011/0081640 A1 | 4/2011 | Tseng et al. | |
| 2011/0099203 A1 | 4/2011 | Fastring | |
| 2011/0162067 A1 | 6/2011 | Shuart et al. | |
| 2011/0191592 A1 | 8/2011 | Goertzen | |
| 2011/0197259 A1 | 8/2011 | Thibadeau et al. | |
| 2011/0202982 A1 | 8/2011 | Alexander et al. | |
| 2011/0213959 A1 * | 9/2011 | Bodi ................ | H04L 63/0435 713/155 |
| 2011/0246779 A1 * | 10/2011 | Teranishi ............ | H04L 9/3013 713/176 |
| 2012/0005483 A1 | 1/2012 | Patvarczki et al. | |

(56) References Cited

U.S. PATENT DOCUMENTS

| | | | |
|---|---|---|---|
| 2012/0011564 A1 | 1/2012 | Osborn et al. | |
| 2012/0054833 A1 | 3/2012 | Albisu | |
| 2012/0060028 A1* | 3/2012 | Furukawa | H04L 9/3218 713/156 |
| 2012/0084869 A1 | 4/2012 | Bilaney et al. | |
| 2012/0089494 A1* | 4/2012 | Danezis | G06Q 50/06 705/34 |
| 2012/0093310 A1* | 4/2012 | Jin | H04L 9/3218 380/46 |
| 2012/0096071 A1* | 4/2012 | Murphey | H04L 67/42 709/203 |
| 2012/0096077 A1* | 4/2012 | Weerts | G06F 9/5077 709/203 |
| 2012/0167199 A1 | 6/2012 | Riddiford | |
| 2012/0175412 A1 | 7/2012 | Grabiner et al. | |
| 2012/0210126 A1* | 8/2012 | Johnson | G06F 16/00 713/165 |
| 2012/0260329 A1* | 10/2012 | Suffling | H04L 63/104 726/9 |
| 2012/0284787 A1* | 11/2012 | Clemot | G06F 21/34 726/7 |
| 2012/0304284 A1 | 11/2012 | Johnson et al. | |
| 2012/0324226 A1* | 12/2012 | Bichsel | G06F 21/33 713/172 |
| 2013/0019090 A1* | 1/2013 | Wicker | H04L 63/0823 713/151 |
| 2013/0031623 A1 | 1/2013 | Sanders | |
| 2013/0042303 A1 | 2/2013 | Chow et al. | |
| 2013/0043914 A1 | 2/2013 | Gelman | |
| 2013/0047236 A1 | 2/2013 | Singh | |
| 2013/0091171 A1* | 4/2013 | Lee | G06F 21/41 707/784 |
| 2013/0097697 A1 | 4/2013 | Zhu et al. | |
| 2013/0104197 A1 | 4/2013 | Nandakumar | |
| 2013/0111581 A1 | 5/2013 | Griffin et al. | |
| 2013/0125114 A1* | 5/2013 | Frascadore | G06F 21/30 718/1 |
| 2013/0125221 A1* | 5/2013 | Agrawal | H04L 9/0863 726/6 |
| 2013/0179954 A1 | 7/2013 | Bidare | |
| 2013/0198818 A1* | 8/2013 | Hitchcock | H04L 63/08 726/5 |
| 2013/0201106 A1 | 8/2013 | Naccache | |
| 2013/0227139 A1* | 8/2013 | Suffling | H04L 9/3226 709/225 |
| 2013/0268775 A1 | 10/2013 | Hawkins | |
| 2013/0340057 A1 | 12/2013 | Kitlyar | |
| 2014/0006512 A1 | 1/2014 | Huang et al. | |
| 2014/0023279 A1 | 1/2014 | Fahn et al. | |
| 2014/0028554 A1 | 1/2014 | De Los Reyes et al. | |
| 2014/0164267 A1* | 6/2014 | Bianchini | G06Q 40/04 705/317 |
| 2014/0181956 A1 | 6/2014 | Ahn et al. | |
| 2014/0201831 A1 | 7/2014 | Yi et al. | |
| 2014/0233740 A1 | 8/2014 | Niamut et al. | |
| 2014/0282961 A1 | 9/2014 | Dorfman et al. | |
| 2014/0320420 A1 | 10/2014 | Ida et al. | |
| 2014/0331057 A1 | 11/2014 | Thibadeau et al. | |
| 2014/0359653 A1 | 12/2014 | Thorpe et al. | |
| 2014/0365528 A1* | 12/2014 | Simard | G06Q 50/01 707/788 |
| 2014/0373132 A1 | 12/2014 | Basmov et al. | |
| 2014/0380431 A1* | 12/2014 | Alonso Cebrian | H04L 63/0838 726/4 |
| 2015/0033306 A1 | 1/2015 | Dickenson et al. | |
| 2015/0128219 A1* | 5/2015 | Guday | H04W 12/50 726/4 |
| 2015/0135305 A1* | 5/2015 | Cabrera | G06F 21/62 726/17 |
| 2015/0138584 A1 | 5/2015 | Tsongas et al. | |
| 2015/0180902 A1 | 6/2015 | Biswas et al. | |
| 2015/0301724 A1 | 10/2015 | Thibadeau, Sr. et al. | |
| 2015/0304303 A1 | 10/2015 | Thibadeau, Sr. et al. | |
| 2015/0310188 A1 | 10/2015 | Ford et al. | |
| 2015/0324609 A1* | 11/2015 | Grubel | G06F 21/64 726/26 |
| 2015/0349957 A1 | 12/2015 | Thibadeau, Sr. et al. | |
| 2015/0350106 A1* | 12/2015 | Whalley | H04L 67/20 709/225 |
| 2015/0350204 A1* | 12/2015 | Wang | H04L 63/0876 726/9 |
| 2015/0350210 A1 | 12/2015 | Thibadeau, Sr. et al. | |
| 2015/0381614 A1* | 12/2015 | Hildreth | H04L 67/06 726/7 |
| 2016/0044021 A1 | 2/2016 | Thibadeau, Sr. et al. | |
| 2016/0050198 A1* | 2/2016 | Thibadeau, Sr. | H04L 63/0807 726/6 |
| 2016/0078370 A1* | 3/2016 | McEwen | G06F 21/604 705/5 |
| 2016/0112389 A1* | 4/2016 | Bortolamiol | H04L 63/08 726/6 |
| 2016/0112870 A1* | 4/2016 | Pathuri | H04W 12/04 726/4 |
| 2016/0191507 A1* | 6/2016 | Bao | H04L 67/34 455/411 |
| 2016/0195995 A1 | 7/2016 | Thibadeau, Sr. et al. | |
| 2016/0232336 A1* | 8/2016 | Pitschel | G06F 21/305 |
| 2016/0344872 A1* | 11/2016 | Mathison | H04W 4/50 |
| 2017/0223533 A1 | 8/2017 | Wolman et al. | |
| 2018/0048635 A1 | 2/2018 | Thibadeau, Sr. et al. | |

FOREIGN PATENT DOCUMENTS

| | | |
|---|---|---|
| EP | 2775416 A2 | 9/2014 |
| GB | 2504746 A | 2/2014 |
| RU | 2013113592 A | 10/2014 |
| WO | 03048909 A2 | 6/2003 |
| WO | 2005071518 A1 | 8/2005 |
| WO | 2009039223 A1 | 3/2009 |
| WO | 2011014878 A1 | 2/2011 |
| WO | 2011100017 A1 | 8/2011 |
| WO | 2013003535 A1 | 1/2013 |
| WO | 2014165431 A1 | 10/2014 |

OTHER PUBLICATIONS

Author Unknown, "OpenID Authentication 2.0—Final," Openid. net, Dec. 5, 2007, retrieved on Jan. 1, 2013 from http://openid.net/specs/openid-authentication-2_0.html#http_encoding, 34 pages.

Author Unknown, "Security Assertion Markup Language (SAML) V2.0 Technical Overview," OASIS, Mar. 25, 2008, retrieved on Apr. 14, 2010 from http://docs.oasis-open.org/security/saml/Post2.0/sstc-saml-tech-overview-2.0-cd-02.pdf, 51 pages.

Beideman, Calvin et al., "Set Families with Low Pairwise Intersection," Apr. 17, 2014, retrieved Jan. 15, 2015 from http://www.cs.cmu.edu/~jblocki/, 12 pages.

Blocki, Jeremiah et al., "Adaptive Regret Minimization in Bounded-Memory Games," Decision and Game Theory for Security: Proceedings of the 4th International Conference on Decision and Game Theory for Security (GameSec), Nov. 11-12, 2013, Fort Worth, TX, Springer International Publishing, pp. 65-84, retrieved Jan. 15, 2015 from http://www.cs.cmu.edu/~jblocki/, 19 pages.

Blocki, Jeremiah et al., "Adaptive Regret Minimization in Bounded-Memory Games," Presentation Slides, retrieved Jan. 15, 2015 from http://www.cs.cmu.edu/~jblocki/, 61 pages.

Blocki, Jeremiah et al., "Audit Games," Proceedings of the 23rd International Joint Conference on Artificial Intelligence, Aug. 3-9, 2013, Beijing, China, AAAI Press, pp. 41-47.

Blocki, Jeremiah et al., "Audit Games with Multiple Defender Resources," retrieved Jan. 15, 2015 from http://www.cs.cmu.edu/~jblocki/, 11 pages.

Blocki, Jeremiah et al., "Audit Mechanisms for Provable Risk Management and Accountable Data Governance," Decision and Game Theory for Security: Proceedings of the 3rd International Conference on Decision and Game Theory for Security (GameSec), Budapest, Hungary, Nov. 5-6, 2012, Springer Berlin Heidelberg, pp. 38-59, retrieved Jan. 15, 2015 from http://www.cs.cmu.edu/~jblocki/, 27 pages.

(56) References Cited

OTHER PUBLICATIONS

Blocki, Jeremiah et al., "Audit Mechanisms for Privacy Protection in Healthcare Environments," Proceedings of the 2nd USENIX Conference on Health Security and Privacy (HealthSec'11), Aug. 8-12, 2011, San Francisco, CA, USENIX Association, p. 10, retrieved Jan. 15, 2015 from http://www.cs.cmu.edu/~jblocki/, 2 pages.

Blocki, Jeremiah et al., "Differentially Private Data Analysis of Social Networks via Restricted Sensitivity," Proceedings of the 4th Conference on Innovations in Theoretical Computer Science (ITCS '13), Jan. 10-12, 2013, Berkely, CA, ACM, pp. 87-96, retrieved Jan. 15, 2015 from http://arxiv.org/abs/1208.4586v2, 19 pages.

Blocki, Jeremiah et al., "Differentially Private Data Analysis of Social Networks via Restricted Sensitivity," Presentation Slides, Fall 2012, retrieved Jan. 15, 2015 from http://www.cs.cmu.edu/~jblocki/, 94 pages.

Blocki, Jeremiah, "Senior Research Thesis: Direct Zero-Knowledge Proofs," May 1, 2009, retrieved Jan. 15, 2015 from http://www.cs.cmu.edu/~jblocki/, 16 pages.

Blocki, Jeremiah et al., "GOTCHA Password Hackers!" Proceedings of the 2013 ACM Workshop on Artificial Intelligence and Security (AISec '13), Nov. 4-8, 2013, Berlin, Germany, ACM, 12 pages.

Blocki, Jeremiah et al., "GOTCHA Password Hackers!" Presentation Slides, retrieved Jan. 15, 2015 from http://www.cs.cmu.edu/~jblocki/, 38 pages.

Blocki, Jeremiah et al., "Human Computable Passwords," Oct. 2, 2014, retrieved Jan. 15, 2015 from http://www.cs.cmu.edu/~jblocki/, 43 pages.

Blocki, Jeremiah et al., "Human Computable Passwords," Presentation Slides, Fall 2014, retrieved Jan. 15, 2015 from http://www.cs.cmu.edu/~jblocki/, 111 pages.

Blocki, Jeremiah et al., "The Johnson-Lindenstrauss Transform Itself Preserves Differential Privacy," Proceedings of the 2012 IEEE 53rd Annual Symposium on Foundations of Computer Science (FOCS), Oct. 20-23, 2012, New Brunswick, NJ, IEEE Computer Society, pp. 410-419, retrieved Jan. 15, 2015 from http://www.cs.cmu.edu/~jblocki/, 27 pages.

Blocki, Jeremiah et al., "Naturally Rehearsing Passwords," Advances in Cryptology—ASIACRYPT 2013: Proceedings of the 19th International Conference on the Theory and Application of Cryptology and Information Security, Part II, Bengalaru, India, Dec. 1-5, 2013 Springer Berlin Heidelberg, pp. 361-380, retrieved Jan. 15, 2015 from http://www.cs.cmu.edu/~jblocki/, 34 pages.

Blocki, Jeremiah et al., "Optimizing Password Composition Policies," Proceedings of the 14th ACM Conference on Electronic Commerce, Jun. 16-20, 2013, Philadelphia, PA, ACM, pp. 105-122, retrieved Jan. 15, 2015 from http://www.cs.cmu.edu/~jblocki/, 27 pages.

Blocki, Jeremiah, "Usable and Secure Password Management," Presentation Slides, Spring 2012, retrieved Jan. 15, 2015 from http://www.cs.cmu.edu/~jblocki/, 75 pages.

Blocki, Jeremiah et al., "Regret Minimizing Audits: A Learning-theoretic Basis for Privacy Protection," 2011 IEEE 24th Computer Security Foundations Symposium (CSF), Jun. 27-29, 2011, Cernay-la-Ville, France, IEEE, pp. 312-327, retrieved Jan. 15, 2015 from http://www.cs.cmu.edu/~jblocki/, 16 pages.

Blocki, Jeremiah et al., "Resolving the Complexity of Some Data Privacy Problems," Automata, Languages and Programming: Proceedings of the 37th International Colloquium Conference on Automata, Languages and Programming (ICALP 2010), Jul. 6-10, 2010, Bordeaux, France, Springer Berlin Heidelberg, pp. 393-404, retrieved Jan. 15, 2015 from http://www.cs.cmu.edu/~jblocki/, 18 pages.

Blocki, Jeremiah et al., "Resolving the Complexity of Some Data Privacy Problems," Presentation Slides, 2010, retrieved Jan. 15, 2015 from http://www.cs.cmu.edu/~jblocki/, 36 pages.

Blocki, Jeremiah et al., "Spaced Repetition and Mnemonics Enable Recall of Multiple Strong Passwords," Oct. 6, 2014, retrieved Jan. 15, 2015 from http://www.cs.cmu.edu/~jblocki/, 16 pages.

Blocki, Jeremiah, "Usable Human Authentication: A Quantitative Treatment," Doctoral Thesis, Jun. 30, 2014, retrieved Jan. 15, 2015 from http://www.cs.cmu.edu/~jblocki/, 262 pages.

Dunphy, Paul et al., "Do Background Images Improve "Draw a Secret" Graphical Passwords?" Proceedings of the 14th ACM Conference on Computer and Communications Security (CCS '07), Oct. 29-Nov. 2, 2007, Alexandria, Virginia, ACM, pp. 36-47.

Hughes, Neil, "Future iPhones, iPads could recognize, adjust for individual users," AppleInsider, Aug. 19, 2010, 4 pages, http://appleinsider.com/articles/10/08/19/future_iphones_ipads_could_recognize_adjust_for_individual_users.

Jansen, Wayne et al., "Picture Password: A Visual Login Technique for Mobile Devices," National Institute of Standards and Technology, NISTIR 7030, Jul. 2003, 20 pages.

Pace, Zach, "Signing in with a picture password," http://blogs.msdn.com/b/b8/archive/2011/12/16/signing-in-with-a-picture-password.aspx, Dec. 16, 2011, 9 pages.

Scavo, T. et al., "Shibboleth Architecture," Jun. 8, 2005, retrieved on Jun. 20, 2014 from http:/open-systems.ufl.edu/files/draft-mace-shibboleth-tech-overview-latest.pdf, 31 pages.

Thibadeau, Robert et al., "Proofs of Knowledge on the Web: A New Framework for Password Identification and Capacity to Make Decisions," 2014-NIST-NSTIC-01 Abbreviated Proposal, Bright Plaza, Inc., Philadelphia, Mar. 2, 2014, 5 pages.

Zhao, Ziming et al., "On the Security of Picture Gesture Authentication," 22nd USENIX Security Symposium, Aug. 14-16, 2013, Washington, D.C., pp. 383-398.

International Search Report for PCT/US10/58825, dated Feb. 2, 2011, 2 pages.

Written Opinion of the International Searching Authority for PCT/US10/58825, dated Feb. 2, 2011, 4 pages.

International Preliminary Report on Patentability for PCT/US10/58825, dated May 23, 2012, 3 pages.

International Search Report and Written Opinion for PCT/US2014/032342, dated Jul. 4, 2014, 14 pages.

Written Opinion of the International Searching Authority for PCT/US2014/032342, dated Mar. 17, 2015, 6 pages.

International Preliminary Report on Patentability for PCT/US2014/032342, dated Jun. 24, 2015, 23 pages.

Extended European Search Report for European Patent Application No. 10845949.6, dated Oct. 9, 2014, 7 pages.

Non-Final Office Action for U.S. Appl. No. 12/884,478, dated Dec. 12, 2012, 15 pages.

Final Office Action for U.S. Appl. No. 12/884,478, dated May 20, 2013, 19 pages.

Advisory Action for U.S. Appl. No. 12/884,478, dated Sep. 9, 2013, 3 pages.

Notice of Allowance and Examiner-Initiated Interview Summary for U.S. Appl. No. 12/884,478, dated Apr. 4, 2014, 10 pages.

Non-Final Office Action for U.S. Appl. No. 14/330,986, dated Dec. 16, 2014, 18 pages.

Final Office Action for U.S. Appl. No. 14/330,986, dated Apr. 27, 2015, 20 pages.

Advisory Action and Examiner Initiated Interview for U.S. Appl. No. 14/330,986, dated Jul. 14, 2015, 3 pages.

Invitation to Pay Additional Fees and Partial International Search Report for PCT/US2015/027040, dated Jul. 24, 2015, 7 pages.

Decision on Appeal for U.S. Appl. No. 14/330,986, dated Mar. 27, 2018, 10 pages.

Final Office Action for U.S. Appl. No. 14/728,759, dated Mar. 15, 2018, 19 pages.

Examination Report for European Patent Application No. 15721438.8, dated Jul. 17, 2018, 7 pages.

Supplemental Notice of Allowability for U.S. Appl. No. 15/295,718, dated Nov. 15, 2017, 12 pages.

Supplemental Notice of Allowability for U.S. Appl. No. 15/295,718, dated Dec. 8, 2017, 12 pages.

Examination Report for European Patent Application No. 15729691.4, dated Sep. 13, 2018, 5 pages.

Non-Final Office Action for U.S. Appl. No. 14/693,121, dated Aug. 6, 2015, 16 pages.

Non-Final Office Action for U.S. Appl. No. 14/728,902, dated Aug. 26, 2015, 15 pages.

(56) References Cited

OTHER PUBLICATIONS

Invitation to Pay Additional Fees and Partial International Search Report for PCT/US2015/033823, dated Aug. 14, 2015, 7 pages.
International Search Report and Written Opinion for PCT/US2015/033830, dated Aug. 24, 2015, 11 pages.
Non-Final Office Action for U.S. Appl. No. 14/330,986, dated Sep. 15, 2015, 16 pages.
Non-Final Office Action for U.S. Appl. No. 14/728,759, dated Sep. 10, 2015, 15 pages.
International Search Report and Written Opinion for PCT/US2015/033811, dated Sep. 21, 2015, 10 pages.
International Search Report and Written Opinion for PCT/US2015/044694, dated Oct. 2, 2015, 10 pages.
Author Unknown, "Cognitive test," Wikipedia.com, last modified Oct. 28, 2014, retrieved on Nov. 11, 2015, 3 pages, https://en.wikipedia.org/w/index.php?title=Cognitive_test&oldid=631463869.
Author Unknown, "James McKeen Cattell," Wikipedia.com, last modified Sep. 9, 2015, retrieved on Nov. 11, 2015, 5 pages, https://en.wikipedia.org/wiki/James_McKeen_Cattell.
International Search Report and Written Opinion for PCT/US2015/027040, dated Nov. 20, 2015, 21 pages.
International Search Report and Written Opinion for PCT/US2015/033823, dated Dec. 2, 2015, 18 pages.
Final Office Action for U.S. Appl. No. 14/330,986, dated Feb. 4, 2016, 18 pages.
Advisory Action for U.S. Appl. No. 14/330,986, dated May 2, 2016, 3 pages.
Notice of Allowance for U.S. Appl. No. 14/693,121, dated Jan. 22, 2016, 7 pages.
Final Office Action for U.S. Appl. No. 14/728,902, dated Jan. 29, 2016, 6 pages.
Notice of Allowance for U.S. Appl. No. 14/728,902, dated Mar. 11, 2016, 7 pages.
Non-Final Office Action for U.S. Appl. No. 14/728,904, dated Jan. 25, 2016, 15 pages.
Final Office Action for U.S. Appl. No. 14/728,759, dated Feb. 1, 2016, 17 pages.
Non-Final Office Action for U.S. Appl. No. 14/823,739, dated Nov. 30, 2015, 17 pages.
Final Office Action for U.S. Appl. No. 14/823,739, dated Apr. 28, 2016, 10 pages.
Menezes, A. et al., "Identification and Entity Authentication," Handbook of Applied Cryptography, CRC Press, 1997, pp. 385-424.
International Preliminary Report on Patentability for PCT/US2015/027040, dated Nov. 3, 2016, 15 pages.
International Preliminary Report on Patentability for PCT/US2015/033823, dated Nov. 3, 2016, 12 pages.
International Search Report and Written Opinion for PCT/US2016/020670, dated May 12, 2016, 11 pages.
International Search Report and Written Opinion for PCT/US2016/033793, dated Jul. 22, 2016, 11 pages.
Examination Report for European Patent Application No. 10845949.6, dated Jun. 13, 2016, 6 pages.
Examiner's Answer to the Appeal Brief for U.S. Appl. No. 14/330,986, dated Dec. 7, 2016, 21 pages.
Non-Final Office Action for U.S. Appl. No. 15/069,635, dated Jun. 16, 2016, 6 pages.
Notice of Allowance for U.S. Appl. No. 15/069,635, dated Oct. 18, 2016, 7 pages.
Notice of Allowance for U.S. Appl. No. 14/728,904, dated Jul. 1, 2016, 12pages.
Corrected Notice of Allowability for U.S. Appl. No. 14/728,904, dated Aug. 10, 2016, 9 pages.
Corrected Notice of Allowability for U.S. Appl. No. 14/728,904, dated Oct. 13, 2016, 9 pages.
Non-Final Office Action for U.S. Appl. No. 14/728,759, dated Jul. 26, 2016, 16 pages.
Notice of Allowance for U.S. Appl. No. 14/823,739, dated Jul. 12, 2016, 8 pages.
International Preliminary Report on Patentability for PCT/US2015/033830, dated Dec. 15, 2016, 8 pages.
International Preliminary Report on Patentability for PCT/US2015/033811, dated Dec. 15, 2016, 7 pages.
International Preliminary Report on Patentability for PCT/US2015/044694, dated Feb. 23, 2017, 8 pages.
Final Office Action for U.S. Appl. No. 14/728,759, dated Feb. 15, 2017, 18 pages.
Second Written Opinion for PCT/US2016/033793, dated Apr. 4, 2017, 5 pages.
International Preliminary Report on Patentability for PCT/US2016/033793, dated Jun. 27, 2017, 6 pages.
Non-Final Office Action for U.S. Appl. No. 14/782,257, dated Mar. 9, 2017, 6 pages.
Non-Final Office Action for U.S. Appl. No. 15/409,045, dated Apr. 19, 2017, 8 pages.
Non-Final Office Action for U.S. Appl. No. 15/295,718, dated Mar. 9, 2017, 14 pages.
Notice of Allowance and Examiner-Initiated Interview Summary for U.S. Appl. No. 15/295,718, dated Aug. 14, 2017, 16 pages.
Non-Final Office Action for U.S. Appl. No. 14/728,759, dated Aug. 3, 2017, 19 pages.
Non-Final Office Action for U.S. Appl. No. 15/295,701, dated Apr. 28, 2017, 6 pages.
International Preliminary Report on Patentability for PCT/US2016/020670, dated Sep. 14, 2017, 7 pages.
Notice of Allowance for U.S. Appl. No. 15/409,045, dated Nov. 1, 2017, 7 pages.
Notice of Allowance for U.S. Appl. No. 15/295,701, dated Sep. 25, 2017, 7 pages.
Non-Final Office Action for U.S. Appl. No. 15/554,782, dated Sep. 18, 2019, 16 pages.
Examination Report for European Patent Application No. 16710889.3, dated Aug. 19, 2019, 4 pages.
Notice of Allowance and Examiner-Initiated Interview Summary for U.S. Appl. No. 16/036,525, dated Jan. 13, 2020, 18 pages.
Final Office Action for U.S. Appl. No. 15/554,782, dated May 29, 2020, 17 pages.

\* cited by examiner

INITIAL PROVISIONING THROUGH SHARED PROOFS OF KNOWLEDGE AND CROWDSOURCED IDENTIFICATION

RELATED APPLICATIONS

This application is a 35 U.S.C. § 371 national phase filing of International Application No. PCT/US16/33793, filed May 23, 2016, which claims the benefit of provisional patent application Ser. No. 62/165,251, filed May 22, 2015, the disclosures of which are hereby incorporated herein by reference in theft entireties.

FIELD OF THE DISCLOSURE

The present disclosure relates to proofs of knowledge for authenticating with relying party servers.

BACKGROUND

User accounts are ubiquitous on the web. Often times, before using a new application or service on the Internet, a user has to create (or provision) an account. Advances in technology have made it easy for users to create accounts online, but how do the service providers know that the account they have just created is for the right person and not for a misappropriated identity? This is known as the initial provisioning problem and may include the verification that users who sign up for new accounts are indeed the people whom they are representing themselves to be. Also, having these multiple accounts often requires the use of multiple different passwords that may require differing lengths and complexities. Remembering and managing these passwords or other proofs of knowledge can be cumbersome and possibly lead to reduced security.

While all service providers would like to make sure that they are delivering content and services to the users who are indeed the people who they represent themselves to be, there are varying degrees of importance to the initial provisioning problem. For example, it may not be significant if a misappropriated identity is used to create a new account for an email newsletter. But it is another matter altogether if the misappropriated identity is used to create a new account for online banking, online health information, or other services involving sensitive information.

There are many current systems in place to address the initial provisioning problem. Some systems are simple, such as email verification. Email verification involves sending a link to the email address associated with the account to make sure that the owner of the email address intended for the account to be created. Other systems are more complex and involve physical identity verification. Some examples of this include the Trusted Traveler Program for business travelers or the Common Access Card (CAC) for Department of Defense employees. In those cases, the user must visit a designated center and have their credentials verified by an approved representative before the user account is created.

Systems like email verification are convenient but are not reliable in that they do not truly verify identity. Physical identification systems are highly reliable but can be very inconvenient. As such, there needs to be a system that is convenient and reliable. As such, there is a need for improvements for initial provisioning.

SUMMARY

Systems and methods for initial provisioning through shared Proofs of Knowledge (PoKs) and crowdsourced identification are provided. In some embodiments, a method of sharing a PoK between a first Relying Party (RP) server and a second RP server includes receiving, by the first RP server, a request from a client device by a user for sharing the PoK. The method also includes causing, by the first RP server, the PoK to be provided to the client device and receiving, by the second RP server, a request from the client device to use the shared PoK for authentication of the user. In this way, the user may be provided additional convenience by allowing the reuse of the shared PoK. Also, depending on the number of RP servers that accept the shared PoK, the user may also be provided a degree of crowdsourced identification.

In some embodiments, causing the PoK to be provided to the client device includes sending a request to share the PoK to a Password Service (PS) server and, in response to the request to share the PoK, sending the PoK to the client device.

In some embodiments, the method also includes, prior to causing the PoK to be provided to the client device, verifying that sharing the PoK is permitted and causing the PoK to be provided to the client device in response to verifying that sharing the PoK is permitted.

In some embodiments, the method also includes storing, by the client device, the PoK in a harddrive, a browser, a secure module, and/or a virtual machine instance.

In some embodiments, the method also includes, prior to receiving the request from the client device for sharing the PoK, authenticating that the user is permitted to access the first RP server. In some embodiments, the method also includes, prior to receiving the request from the client device to use the shared PoK for authentication of the user, authenticating that the user is permitted to access the second RP server.

In some embodiments, authenticating that the user is permitted to access the second RP server includes determining that the user is creating a user account at the second RP server. In some embodiments, sending the request to share the PoK to the PS server also includes sending certificate attributes for the first RP server. In some embodiments, the shared PoK includes a certificate including the certificate attributes for the first RP server signed by the first RP server. In some embodiments, the shared PoK includes a certificate including the certificate attributes for the first RP server signed by the PS server. In some embodiments, the certificate does not include the identity of the first RP server.

In some embodiments, the method also includes verifying that the shared PoK is acceptable for authentication and, in response to verifying that the shared PoK is acceptable for authentication, logging the user in to the second RP server. In some embodiments, the method also includes determining that a cognition test is needed to use the shared PoK for authentication, causing the user to complete the cognition test, and in response to successful completion of the cognition test, accepting the shared PoK for authentication.

In some embodiments, determining that the cognition test is needed to use the shared PoK for authentication includes determining that a previously accepted shared PoK has changed. In some embodiments, determining that the cognition test is needed to use the shared PoK for authentication includes determining that the cognition test is needed based on one or more requirements by the second RP server. In some embodiments, causing the user to complete the cognition test includes requesting a login token from a CS server corresponding to the user, redirecting the user to the CS server including the login token, and receiving an authentication token from the client device. In some embodiments, the CS server is chosen by the user.

In some embodiments, a system includes a client device, a first RP server, and a second RP server. The first RP server is configured to receive a request from the client device by a user for sharing a PoK and cause the PoK to be provided to the client device. The second RP server is configured to receive a request from the client device to use the shared PoK for authentication of the user.

In some embodiments, a method of operating a PS server for sharing a PoK between a first RP server and a second RP server includes receiving a request to share the PoK for the first RP server, generating a shared PoK, and providing the shared PoK to a requester.

In some embodiments, a method of operating a client device for sharing a PoK between a first RP server and a second RP server includes sending to the first RP server a request from a user for sharing the PoK, receiving a shared PoK, and sending to the second RP server a request to use the shared PoK for authentication of the user.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

As discussed above, there is a need for improvements for initial provisioning. Systems and methods for initial provisioning through shared Proofs of Knowledge (PoKs) and crowdsourced identification are provided. In some embodiments, a method of sharing a PoK between a first Relying Party (RP) server and a second RP server includes receiving, by the first RP server, a request from a client device by a user for sharing the PoK. The method also includes causing, by the first RP server, the PoK to be provided to the client device and receiving, by the second RP server, a request from the client device to use the shared PoK for authentication of the user. In this way, the user may be provided additional convenience by allowing the reuse of the shared PoK. Also, depending on the number of RP servers that accept the shared PoK, the user may also be provided a degree of crowdsourced identification. PoKs may be text or picture based passwords or may involve the answers to cognitive tests that are established to verify identity and/or mental capacity.

Some terms that are used herein are defined as follows. The term "Requesting Party" shall be abbreviated as RQP in the singular and RQPs in the plural. The term "Relying Party" shall be abbreviated as RP in the singular and RPs in the plural. Both the RQP and RP refer to websites, online service providers, and/or applications that offer services to users. The RQP/RP knows the identities of the users of the site, but, if the RQP/RP uses a password service, then it does not know the passwords of users of the site (i.e., the user's PoK).

The term "Password Service" shall be abbreviated as PS and shall refer to a website that offers password PoKs as a service to RQPs/RPs. There may be a timeout associated with the PS, i.e., if the user does not respond with the proper password before the timeout expires, then access is denied and the user has to try again.

The term "Cognition Service" shall be abbreviated as CS and shall refer to a website that offers cognitive PoKs as services to RQPs/RPs. The CS allows each user to set up one or more tests for that specific user to employ at a later time to provide a proof of a cognitive state (a cognitive PoK). For example, a user might set up a test that shows a picture of 40 people that represent the entire extended family of the user and asks the user to pick out 3 specific relatives from the photo within a specific timeframe. Not all cognitive tests will contain a time limitation, but such a limitation generally enhances the value of the test. If the user is not able to complete a test that the user established for himself/herself before a timeout expires, then it could be indicative of a state of cognitive impairment (e.g., inebriation, etc.). Differentiating these cognitive states is the primary purpose of the cognitive PoK.

A system which is capable of publishing arbitrary cognitive testing was previously disclosed in U.S. Provisional Patent Application No. 62/006,472 entitled "Advanced Proofs of Knowledge for the Web," the disclosure of which is hereby incorporated herein by reference in its entirety. A similar system was also described in the non-confidential pre-publication version of an academic paper submitted to the IEEE entitled "Completely Refactoring User Authentication," the disclosure of which is hereby incorporated herein by reference in its entirety.

Figure 1:
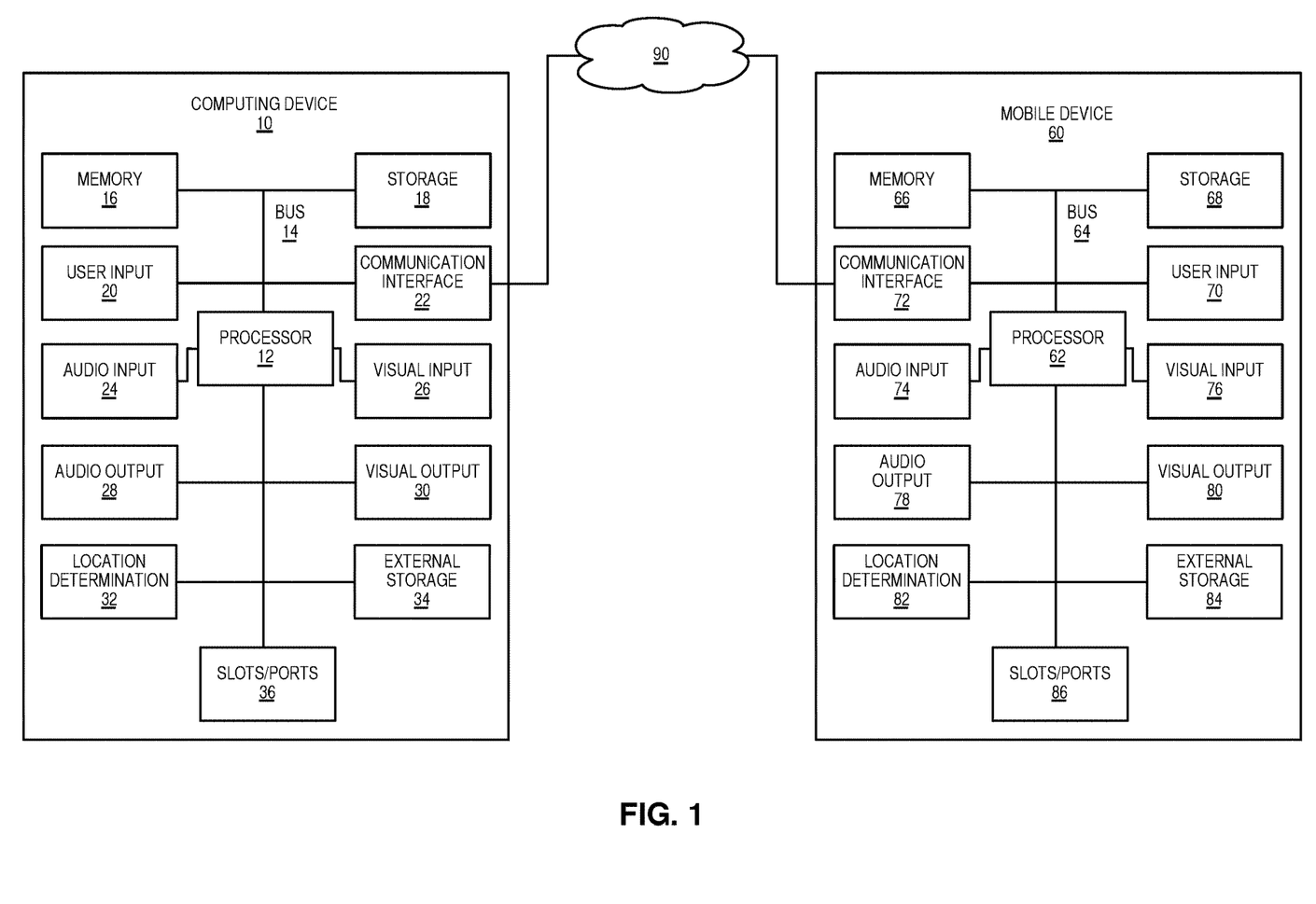
FIG. 1 illustrates an example of a generic computing device and a generic mobile device, according to some embodiments of the present disclosure.

FIG. 1 illustrates an example of a generic computing device and a generic mobile device, according to some embodiments of the present disclosure. As shown in FIG. 1, generic computing device 10 includes one or more processors 12 connected to a communication bus 14. Also connected to this bus 14 are a short-term memory 16 (such as DRAM and other types of volatile storage) and a long-term storage 18 (such as harddrives, solid state drives, and other types of non-volatile storage). A user input 20 (such as a mouse or touch screen) and a communication interface 22 (for Ethernet, Wi-Fi, LTE, Bluetooth, and other types of communication) are also included. Depending on the computing device 10, an audio input 24 (such as a microphone), visual input 26 (such as a camera or video recorder), audio output 28 (such as a speaker), and visual output 30 (such as a display) are also connected via the bus 14 to the processor 12.

Also shown in FIG. 1, the computing device 10 may include a mechanism for location determination 32 (such as a GPS or AGPS chip), an ability to connect to external storage 34 (such as external harddrives and flash drives), and other various slots and ports 36 (such as USB and serial ports and SD card readers).

FIG. 1 also shows a generic mobile device 60 which includes one or more processors 62 connected to a communication bus 64. Also connected to this bus 64 are a short-term memory 66 (such as DRAM and other types of volatile storage) and a long-term storage 68 (such as harddrives, solid state drives, and other types of non-volatile storage). A user input 70 (such as a mouse or touch screen) and a communication interface 72 (for Ethernet, Wi-Fi, LTE, Bluetooth, and other types of communication) are also included. Depending on the mobile device 60, an audio input 74 (such as a microphone), visual input 76 (such as a camera or video recorder), audio output 78 (such as a speaker), and visual output 80 (such as a display) are also connected via the bus 64 to the processor 62.

Also shown in FIG. 1, the mobile device 60 may include a mechanism for location determination 82 (such as a GPS or AGPS chip), an ability to connect to external storage 84 (such as external harddrives and flash drives), and other various slots and ports 86 (such as USB and serial ports and SD card readers). A communications network 90 allows for communication between the computing device 10 and the mobile device 60 via the communication interface 22 and the communication interface 72.

Various entities described herein may be implemented as a computing device 10 or as a mobile device 60 depending on implementation.

Figure 2:
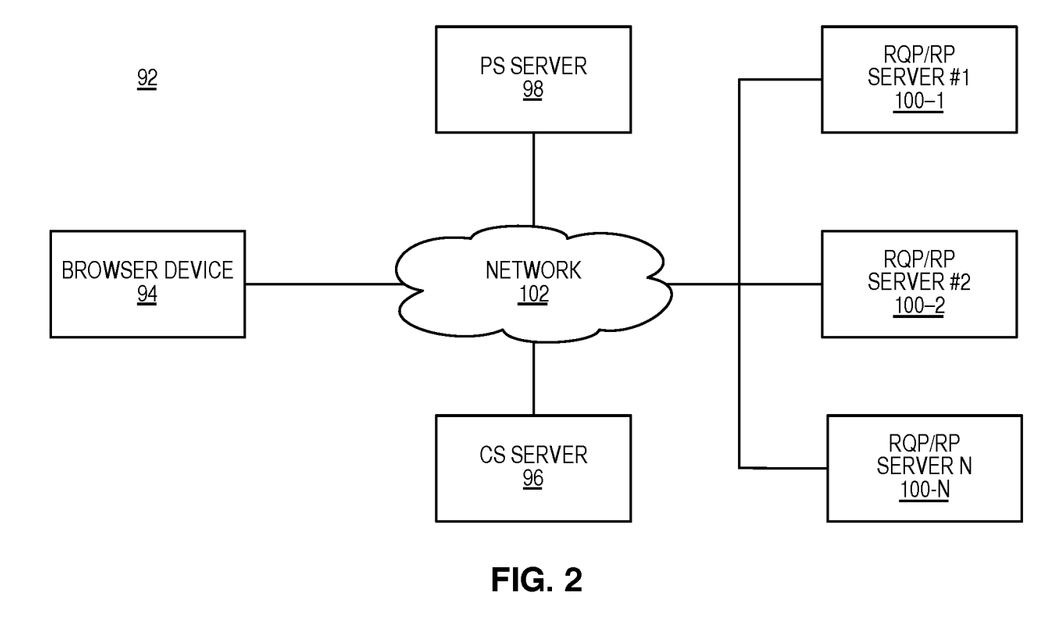
FIG. 2 illustrates a communication network, according to some embodiments of the present disclosure.

FIG. 2 illustrates a system 92, according to some embodiments of the present disclosure. The system 92 includes a browser device 94 (also generally referred to herein as a client device 94), a PS server 98, a CS server 96, and one or more RQP/RP servers 100-1 to 100-N. In other embodiments, there may be more than one PS server (98-1 to 98-N) and there may be more than one CS server (96-1 to 96-N). Note that while PS server 98 and CS server 96 are illustrated in FIG. 2 as individual single servers, each may be alternatively be distributed across multiple servers having the respective functionality of the PS server 98 and CS server 96.

And still in other embodiments, the PS server 98 and CS server 96 may also be combined into one single server or distributed across multiple servers having the overall combined functionality of PS server 98 and CS server 96.

The devices of system 92 may take on the form of any of the devices of FIG. 1. In other words, the browser device 94 may be a laptop like computing device 10, PS server 98 may be a blade server like computing device 10, CS server 96 may be a workstation device like computing device 10, and RQP/RP Server #1 100-1 may be a mainframe like computing device 10. Browser device 94 may be a smartphone like mobile device 60, and the PS server 98 may be a tablet like mobile device 60. A network 102 of system 92 may take on any form of the network 90 of FIG. 1.

A platform that may serve as a basis for some embodiments is described in International Patent Publication Number WO/2014/165431 entitled "Method and System Providing a Picture Password Proof of Knowledge," the disclosure of which is hereby incorporated herein by reference in its entirety. Also, a generalized PoK service that includes not only a PoK to establish user identity which is separate from the knowledge of the identity, but also advanced capability testing was previously described in U.S. Pat. No. 8,813,183 entitled "Method and System for Processor or Web Logon," the disclosure of which is hereby incorporated herein by reference in its entirety.

According to some embodiments, a solution to the problem of the initial provisioning of a new service (a new RQP/RP 100) is to allow users to share a PoK credential from one of the existing services of the user in provisioning a new service. Identity may be verified using password PoKs, cognitive PoKs, or both. For example, a user may want to use the same PoK credential from their Yahoo account with Google, even if the public/private key pairs are different.

The ability to share the same PoK across RQPs/RPs 100 may make the user's life easier. In some embodiments, at the click of a button, the PoK is shared.

It should be emphasized that in some embodiments what is shared is a true PoK credential, not a token. Also, in some embodiments, the RQP/RP 100 does not have to know the PoK itself; a PoK credential is sufficient. This further enhances security. The user's identity is more secure when the RQP/RP 100 does not know the PoK associated with the user.

For example, there are alternative systems that manage identity online by essentially keeping the public/private key pair for each RQP/RP 100 used by the user. In those systems, with a sufficient PoK, you can create a new key pair for a new RQP/RP 100, but that key pair is not shared between RQPs/RPs 100.

In some embodiments described herein, sharing a PoK between RQPs/RPs 100 can be implemented for either symmetric key cryptography (shared secret) or asymmetric key cryptography (public/private keys).

Figure 3:
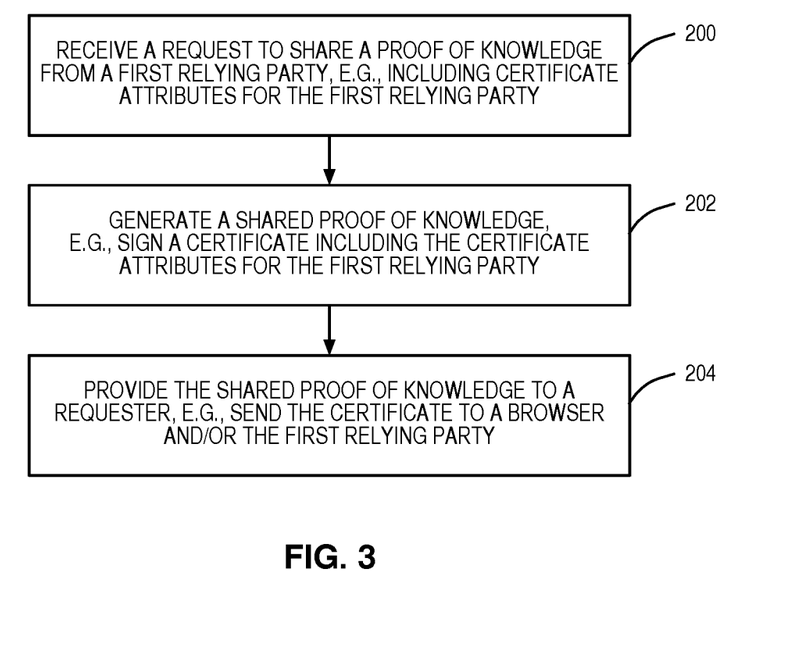
FIG. 3 illustrates a process for sharing a Proof of Knowledge (PoK), according to some embodiments of the present disclosure.

FIG. 3 illustrates a process for sharing a PoK, according to some embodiments of the present disclosure. First, a PS server 98 receives a request to share a PoK from a first RP server 100-1 (step 200). As will be discussed in more detail below, this request may optionally include certificate attributes for the first RP server 100-1. The PS server 98 generates a shared PoK (step 202). In some embodiments, this may be accomplished by signing a certificate including the certificate attributes for the first RP server 100-1. The PS server 98 then provides the shared PoK to a requester (step 204). Depending on the implementation, the PS server 98 may send the certificate to a browser device 94 and/or the first RP server 100-1.

As an example implementation, a use-case employing symmetric key cryptography is provided:

(1) A user logs into an account with RP server 100-1. RP server 100-1 might be an online stock brokerage firm, for example. The user is logging into the user's own brokerage account. The brokerage firm is assumed to know the user and that this is not a misappropriated account.

(2) The user wants to share the PoK used with RP server 100-1.

(3) RP server 100-1 enables the user to share credentials without knowing the identity of the entity with whom the user is sharing the credentials. For example, the user may want to share the credential with a second RP server 100-2, maybe a bank, for example, but the user may not want RP server 100-2 to know that the user has an account with RP server 100-1. The user just wants to use the RP server 100-1 PoK credential.

(4) At this point, RP server 100-1 sends the PoK credential to the user's machine to be stored, either on the user's harddrive, in the browser, in a hardware security module, in an instance of a virtual machine, or the like.

(5) The user logs off of the account with RP server 100-1.

(6) The user logs onto the second RP server 100-2.

(7) The user directs RP server 100-2 to use the shared PoK credential.

(8) RP server 100-2 gets the PoK credential and now permits the user to use the RP server 100-2 site.

(9) The PoK credential may remain on the user's harddrive or other location, depending upon how it is stored. If it is cryptographically protected, then it can remain because nobody will be able to understand what the credential says.

In the symmetric key case, the issue is permissions on the shared secret. Pretty Good Privacy (PGP) could be used, but it publishes the public key, and there is only one key pair. Therefore, asymmetric key cryptography (public/private keys) would be preferred to minimize the attack surface (the likelihood of a successful attack).

As an example implementation, a use-case employing asymmetric key cryptography is provided:

(1) In this scenario, there are 3 participants. RP server 100-1 (say the brokerage firm, for example), RP server 100-2 (say the bank, for example), and the PS server 98. RP server 100-1 and RP server 100-2 are both online and can utilize asymmetric key cryptography. Further, RP server 100-1 and RP server 100-2 have no visibility or knowledge of each other. It is also assumed that there exists a certificate that confirms that RP server 100-1 knows the user. A blind certificate may be used, and it may take on two forms: (a) the attributes of the certificate belong to RP server 100-1, but the PS server 98 signs it; and (b) the certificate does not include the identity of RP server 100-1, but the certificate is signed by RP server 100-1.

(2) RP server 100-2 could set up rules indicating the minimum entropy level for accepting PoK credentials. In other words, RP server 100-1 could specify the degrees of separation for which it will accept PoK credentials. For example, RP server 100-1 may indicate that it will accept PoKs with at most 1 degree of separation from the primary source for the credential.

In this case, the RP server 100-2 will accept either a blind certificate from step 1 because: (a) the attributes of the certificate are from the primary source of the PoK credential and they are signed by the PS server 98 (i.e. one degree of separation) or (b) the certificate is signed by the primary source of the PoK credential.

The system essentially allows the user to use the user's login from RP server 100-1 with RP server 100-2. For the system to work, RP server 100-1 has to let the user share their PoK credential, the user has to transfer the PoK credential, and RP server 100-2 has to accept the PS server 98 attestation that the PS server 98 knows that the user is the person the user claims to be.

In some embodiments, this arrangement ensures that RP server 100-1 and RP server 100-2 do not know each other.

Figure 4:
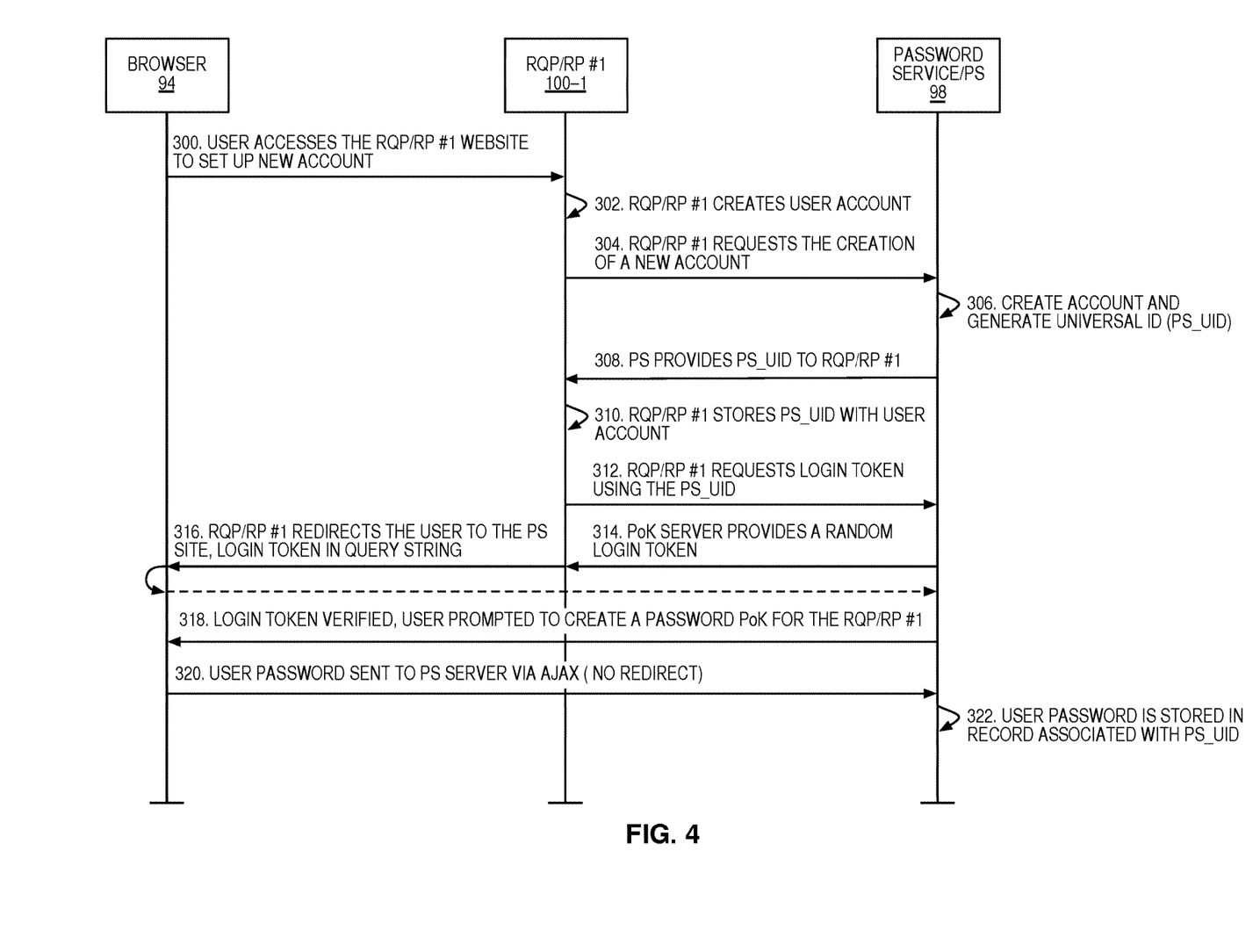
FIG. 4 illustrates a process for provisioning a new account at a Relying Party (RP) server, according to some embodiments of the present disclosure.

FIG. 4 illustrates a process for provisioning a new account at the first RP server 100-1, according to some embodiments of the present disclosure. First, a user at the browser device 94 accesses the RP server 100-1 website to set up or provision a new account (step 300). The RP server 100-1 creates a user account (step 302) and requests the creation of a new account from the PS server 98 (step 304). The PS server 98 creates an account and generates a universal ID (PS_UID) (step 306) and provides this PS_UID to the RP server 100-1 (step 308).

The RP server 100-1 stores the PS_UID with the user account (step 310) and requests a login token from the PS server 98 using the PS_UID (step 312). The PS server 98 provides a random login token to the RP server 100-1 (step 314) which then redirects the user to the PS site with the login token in the query string (step 316). When the login token has been verified, the user is prompted to create a new password/PoK for the RP server 100-1 (step 318). In some embodiments, the user's PoK is sent to the PS server 98 via Asynchronous JavaScript and XML (AJAX) or some other form that does not permit a redirect (step 320). The PS server 98 stores the PoK in the record associated with the PS_UID (step 322). In some embodiments, the PS server 98 stores a hash of the user's PoK. In this respect, the PS server 98 does not know what the user's PoK is, but can compare it to a subsequent PoK to determine a match for authentication.

The type of PoK established might depend on the security requirements of the system and the capabilities of the system. Some examples of PoKs would be plaintext passwords, picture passwords, video passwords, etc. In some embodiments, there are no usernames, but only a fixed number of potential passwords or PoKs. In these embodiments, provisioning may consist of identifying one of the password slots that has not been used and provisioning that for the user.

Figure 5:
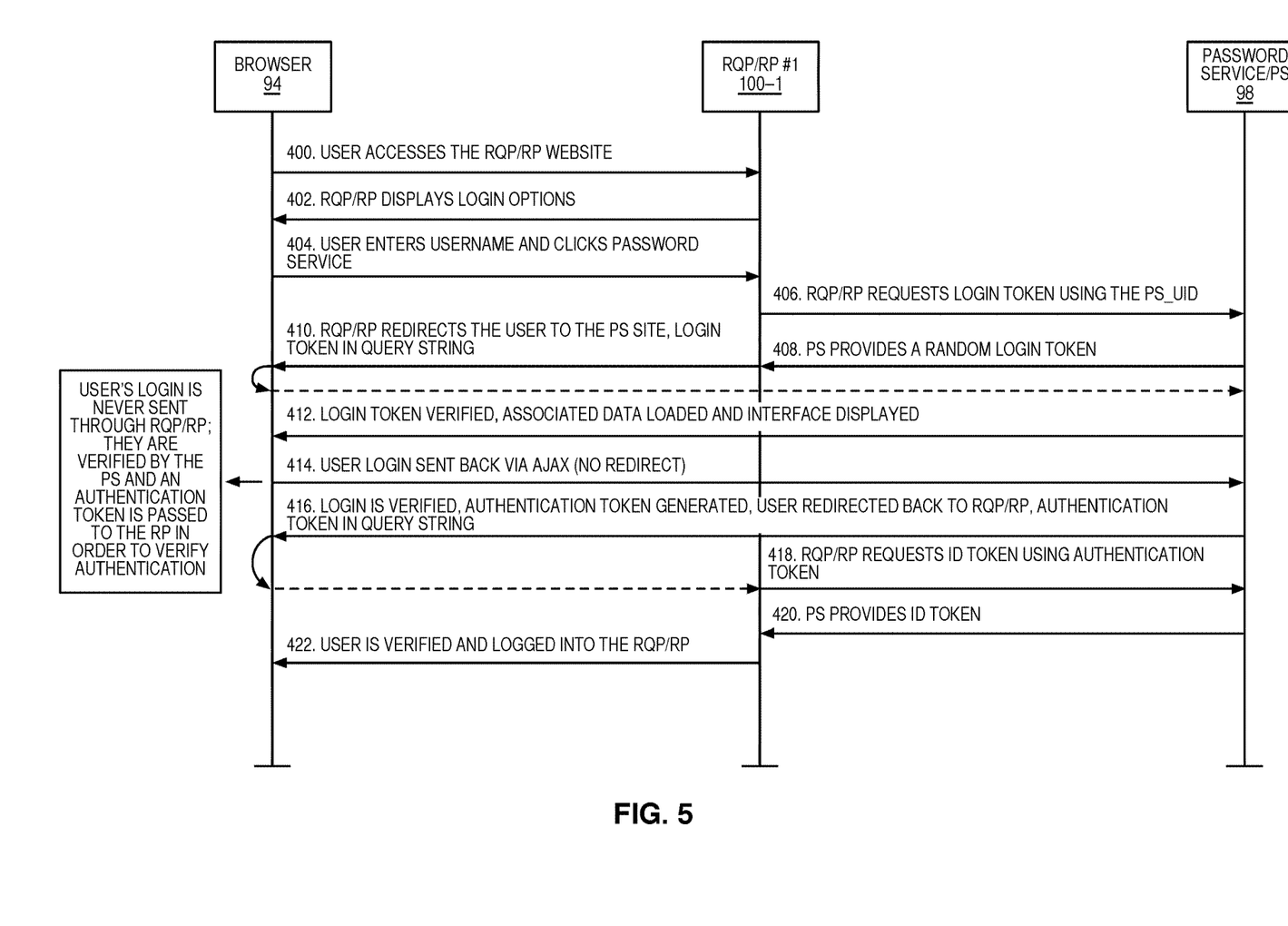
FIG. 5 illustrates a process for logging into an RP server, according to some embodiments of the present disclosure.

FIG. 5 illustrates a process for logging into the RP server 100-1, according to some embodiments of the present disclosure. First, a user at the browser device 94 accesses the RP server 100-1 (step 400). The RP server 100-1 displays login options (step 402) and the user enters a username and clicks PS (step 404).

The RP server 100-1 requests a login token from the PS server 98 using the PS_UID (step 406). The PS server 98 provides a random login token to the RP server 100-1 (step 408) which redirects the user to the PS server 98 site with the login token included in the query string (step 410). If the login token is verified, associated data is loaded and the interface is displayed (step 412). In some embodiments, the user's PoK is sent to the PS server 98 via AJAX or some other form that does not permit a redirect (step 414).

If the login is verified, the PS server 98 generates an authentication token and the user is redirected back to the RP server 100-1 with the authentication token in the query string (step 416). The RP server 100-1 requests an ID token using the authentication token (step 418). The PS server 98 provides the ID token to the RP server 100-1 (step 420) and the user is verified and logged into the RP server 100-1 (step 422).

In some embodiments, the user's login is never sent through the RP server 100-1. It is verified by the PS server 98 and an authentication token is passed to the RP server 100-1 in order to verify authentication.

Figure 6:
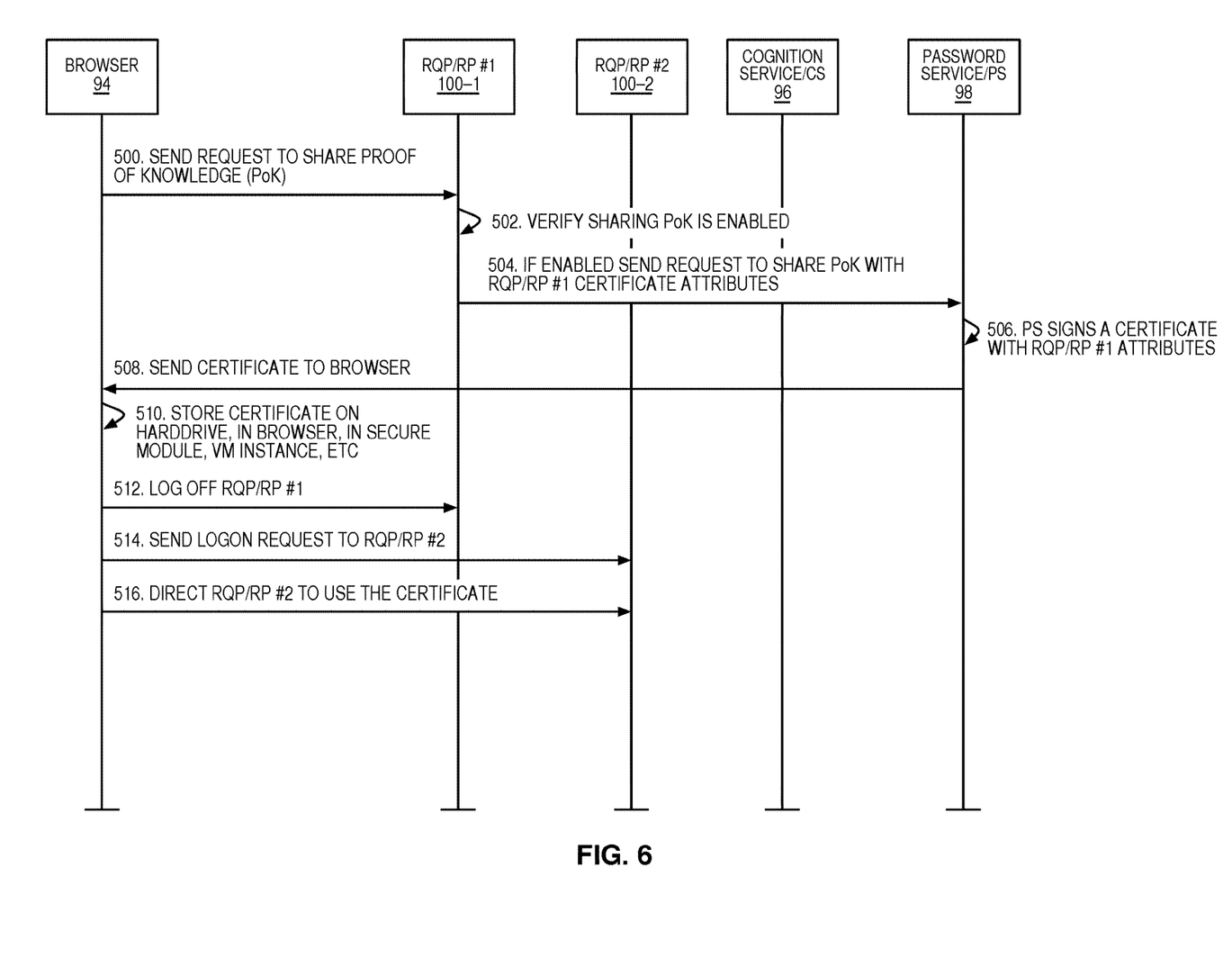
FIG. 6 illustrates a process for sharing a PoK between a first RP server and a second RP server, according to some embodiments of the present disclosure.

FIG. 6 illustrates a process for sharing a PoK between a first RP server 100-1 and a second RP server 100-2, according to some embodiments of the present disclosure. In some embodiments, once logged in, the user at the browser device 94 sends a request to share the PoK to the RP server 100-1 (step 500). The RP server 100-1 verifies that it has enabled sharing of PoKs (step 502). In some embodiments, this verification is optional. In some embodiments, whether or not sharing is enabled may be determined based on the user's identity, as a broader policy, or based on other criteria. If sharing is enabled, then the RP server 100-1 sends its certificate attributes to the PS server 98 (step 504) where the PS server uses the certificate attributes to sign the certificate (step 506). In other embodiments, the certificate does not include the identity of the RP server 100-1, but the certificate is signed by RP server 100-1. In some embodiments, the certificate conforms to the X.509 standard for managing digital certificates. The certificate is then sent back to the browser device 94 (step 508) where it is stored. In different embodiments, the certificate is stored in a variety of ways, including but not limited to: in the browser, on the user's harddrive, on a hardware security module on the user device, in an instance of a virtual machine, etc. (step 510). The user then optionally logs off of the RP server 100-1 (step 512), logs into the second RP server 100-2 (step 514), and directs the second RP server 100-2 to use the certificate that is stored on the user's device (step 516).

In some embodiments, the shared PoK may not be retained by the browser device 94 after this process. However, if the shared PoK is retained, the user may be able to direct multiple RP servers 100 to use the shared PoK. Then, in some embodiments, the PS Server 98 can keep track of how many RP servers 100 have accepted the PoK credential. This becomes a crowd-sourced part of the system that provides a type of crowd-sourced identification of the user. In some embodiments, in addition to, or in lieu of, the minimum degree of separation for accepting PoK credentials, RP servers 100 may set additional thresholds for the number of RP servers 100 who have accepted the PoK credential. For example, an RP server 100 may specify that it only accepts PoK credentials within 1 degree of separation from the primary source or it will accept PoK credentials regardless of degree of separation as long as at least ten other RP servers 100 have accepted the PoK (endorsements of the PoK credential). In some embodiments, the RP servers 100 could be classified and the RP server 100 could specify the number and class of endorsements. For example, the RP server 100 may accept the PoK credential regardless of degree of separation as long as at least ten RP servers 100 requiring strong security and at least three RP servers 100 requiring medium security have accepted the PoK credential.

Figure 7A:
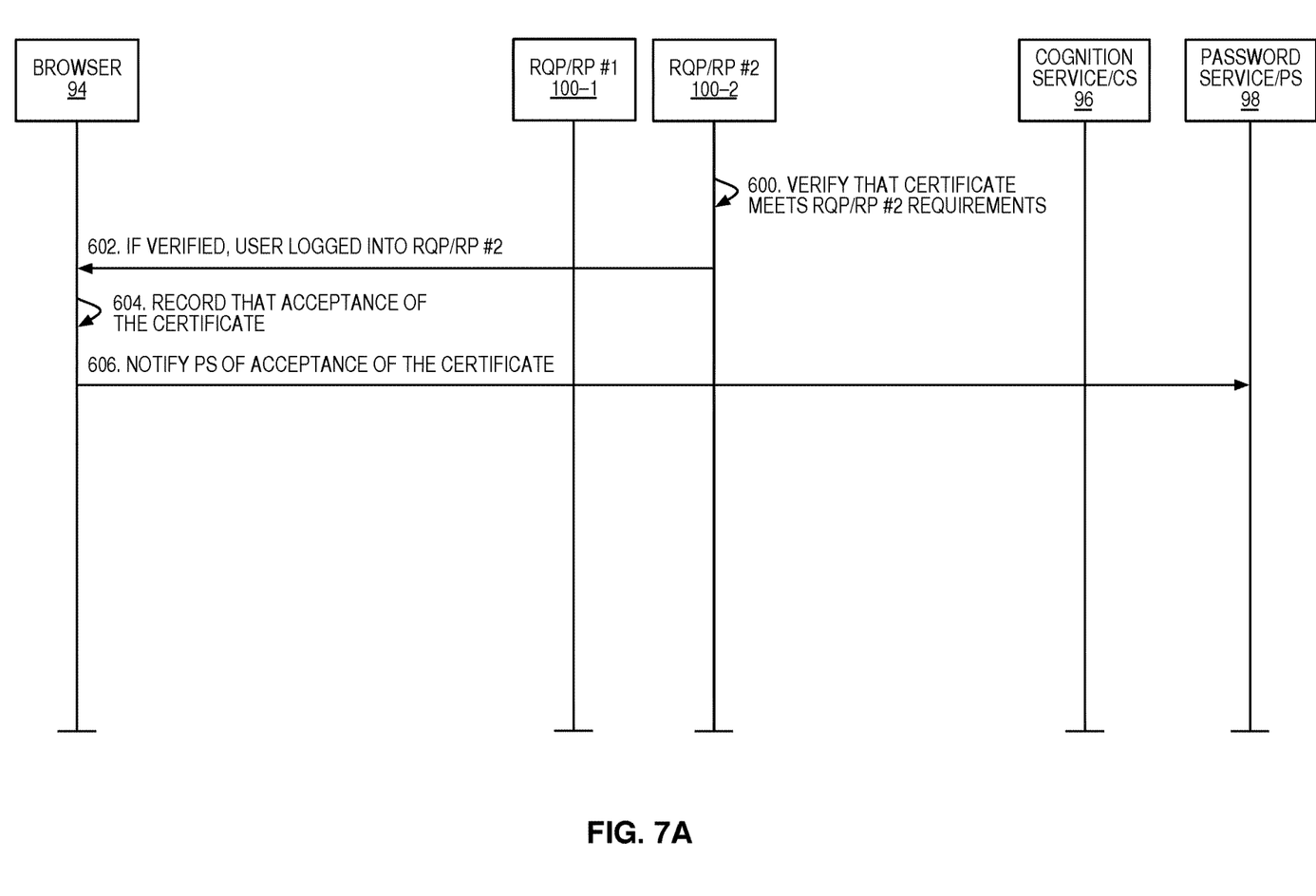
FIGS. 7A and 7B illustrate processes for accepting a shared PoK by a second RP server, according to some embodiments of the present disclosure.
Figure 7B:
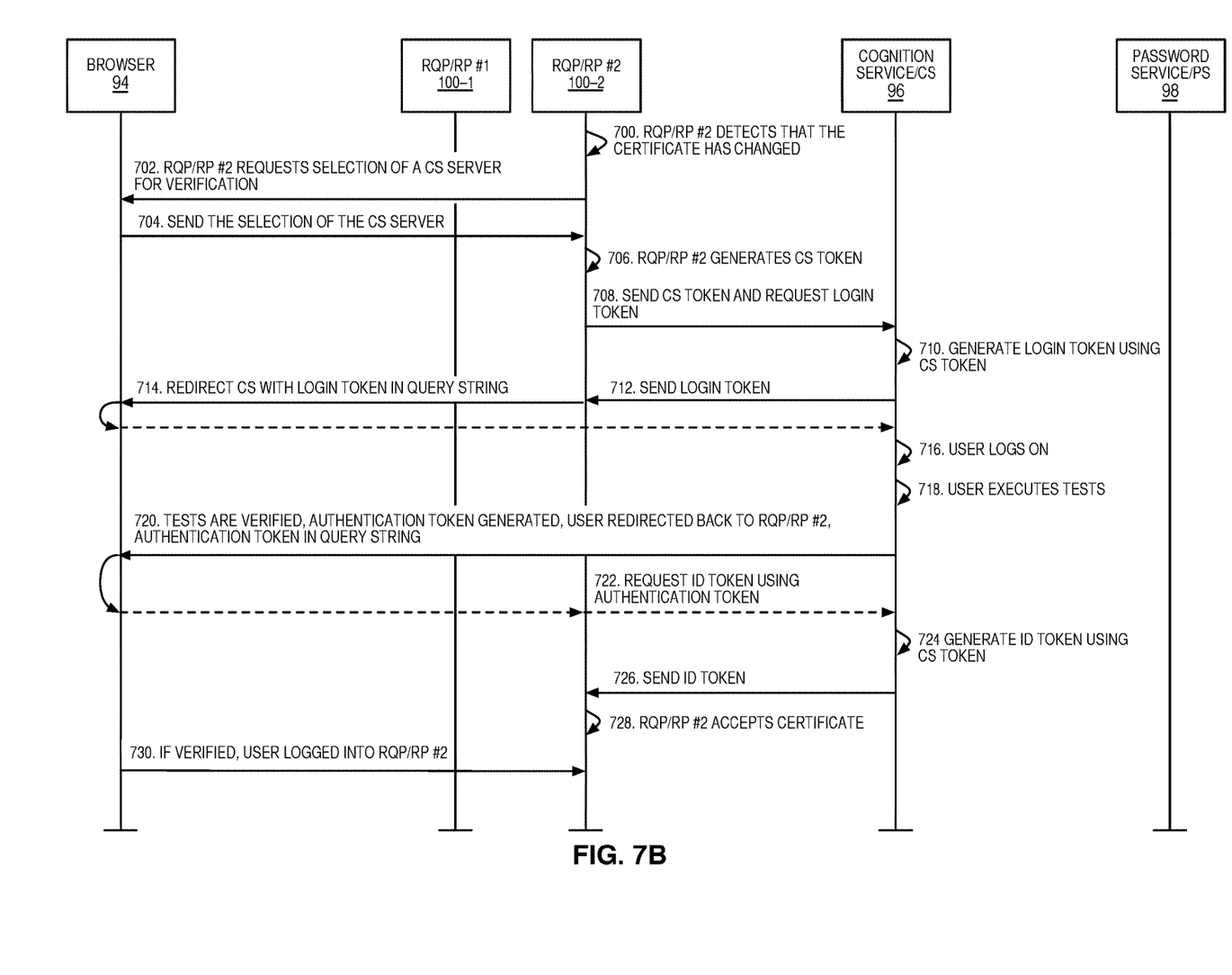

Now that the second RP server 100-2 has been directed by the user to use the shared PoK, the second RP server 100-2 may determine how to proceed. FIGS. 7A and 7B illustrate processes for accepting the shared PoK by the second RP server 100-2, according to some embodiments of the present disclosure.

As illustrated in FIG. 7A, the second RP server 100-2 verifies that the certificate/shared PoK meets the requirements to accept the shared PoK to use for authentication (step 600). This may involve many determining factors such as those discussed above. If the certificate meets the requirements, the user is logged in to the second RP server 100-2 (step 602). In some embodiments, the acceptance of the certificate by the second RP server 100-2 can be stored locally on the client machine (in the browser, on the harddrive, in a secure module, in an instance of a virtual machine, etc.) (step 604). In some embodiments, the browser device 94 may notify the PS server 98 of the acceptance of the certificate (step 606). As discussed above, this may be used in some embodiments to perform crowd-sourced identification or in additional account provisioning for other RP servers 100. In some embodiments, the identity of the second RP server 100-2 may also be recorded along with the acceptance. This identity may be used in some embodiments that take into account the class of endorsements. In some embodiments, the identity of the second RP server may not be specific (like "Bank A") but rather can be a category of RP (such as "Bank"). In this respect, the class of endorsements is still met without disclosing the specific identities of all of the RPs with which the user interacts.

In other embodiments, the second RP server 100-2 may have rules indicating that it will accept certificates with one degree of separation from the source, and so when the PS server 98 signs the certificate with the attributes of the RP server 100-1, then the second RP server 100-2 will accept it. In other embodiments, as discussed above, the second RP server 100-2 may have rules indicating that it will accept certificates only if ten other RP servers 100 have accepted the certificate. In this case, the second RP server 100-2 can request the stored acceptance data (either locally on the client or at the PS server 98) and act accordingly.

The second RP server 100-2 may also have other requirements before accepting the shared PoK. These requirements might be dependent on the identity of the user, the specific RP servers 100 involved, etc. FIG. 7B shows an embodiment wherein the second RP server 100-2 requires the user to successfully complete one or more tests that the user had previously established at a CS server 96 before accepting the certificate for login, such as in the case where the user has recently changed the credentials for the RP server 100-1.

In some embodiments, the CS server 96 hosts tests that a user invents for himself/herself as a mechanism for verifying the user's identity. Since in some embodiments PoK credentials may be stored on the user's harddrive for the purposes of sharing across RP servers 100, it is essential that the PoK credential only undergo a permissioned change.

In some embodiments, for example, the user may be required to successfully pass one or more cognitive tests before the user is able to change the user's PoK credential on the RP server 100-1 and re-export the PoK credential to the user's local machine.

In other embodiments, RP servers 100 that rely on the shared PoK credential may require the cognition tests. For example, the second RP server 100-2 may detect that a PoK credential that had previously been accepted has changed. Because of its own security requirements, RP server 100-2 may refuse to accept the new PoK credential pending successful execution of one or more cognitive tests by the user at the CS server 96. Once those tests have been successfully traversed, then RP server 100-2 would accept the PoK credential again.

Because the RP server 100-2 may not have a relationship with the CS server 96, a mechanism is described for dynamic verification in FIG. 7B. As shown, the second RP server 100-2 may detect that a PoK credential that had previously been accepted has changed (step 700). In some embodiments, the second RP server 100-2 may optionally request the selection of a particular CS server 96 to use for verification if multiple are available (step 702). The second RP server 100-2 may receive the selection of the CS server 96 (step 704) and generate a random number (cs_token) which serves as a temporary identifier (step 706) which is sent to the CS server 96 along with a request for a login_token (step 708). The CS server 96 generates a login_token (which in some embodiments is a hash of the cs_token) (step 710) and sends it to the second RP server 100-2 (step 712) which relays it to the browser device 94 along with a redirection to the CS server 96 (step 714).

In some embodiments, the user may have to login to the CS server 96 directly (step 716). In other embodiments, the user may be able to login to the CS server 96 using the PS server 98. The login_token serves to help the CS server 96 remember which RP server 100 has requested the verification. The user then executes the tests in whatever manner is required (step 718). Upon successful completion of the tests, the CS server 96 generates an auth_token and sends it to the browser device 94 along with a redirect back to the second RP server 100-2 (step 720). The second RP server 100-2 then requests an id_token using the auth_token (step 722). The CS server 96 generates the id_token using the cs_token (step 724) and returns it to the second RP server 100-2 (step 726). In this way, the second RP server 100-2 has secured verification from the CS server 96 regarding the user and then accepts the shared PoK (step 728) and logs the user into the second RP server 100-2 (step 730).

Those skilled in the art will recognize improvements and modifications to the preferred embodiments of the present disclosure. All such improvements and modifications are considered within the scope of the concepts disclosed herein and the claims that follow.

What is claimed is:

1. A method of sharing a Proof of Knowledge, PoK, between a first Relying Party, RP, server and a second RP server, comprising:
   receiving, by the first RP server, a request from a client device by a user for sharing the PoK;
   causing, by the first RP server, the PoK to be provided to the client device;
   prior to receiving the request from the client device to use the shared PoK for authentication of the user, authenticating, by the second RP server, that the user is permitted to access the second RP server, where authenticating that the user is permitted to access the second RP server comprises determining that the user is creating a user account at the second RP server; and
   receiving, by the second RP server, a request from the client device to use the shared PoK for authentication of the user.

2. The method of claim 1 wherein causing the PoK to be provided to the client device comprises:
   sending, by the first RP server, a request to share the PoK to a Password Service, PS, server; and
   in response to the request to share the PoK, sending, by the PS server, the PoK to the client device.

3. The method of claim 2 wherein sending the request to share the PoK to the PS server further comprises sending certificate attributes for the first RP server.

4. The method of claim 3 wherein the shared PoK comprises a certificate including the certificate attributes for the first RP server signed by the first RP server.

5. The method of claim 4 wherein the certificate does not include the identity of the first RP server.

6. The method of claim 3 wherein the shared PoK comprises a certificate including the certificate attributes for the first RP server signed by the PS server.

7. The method of claim 1 further comprising:
   prior to causing the PoK to be provided to the client device, verifying, by the first RP server, that sharing the PoK is permitted; and
   causing the PoK to be provided to the client device in response to verifying that sharing the PoK is permitted.

8. The method of claim 1 further comprising storing, by the client device, the PoK in one or more of the group consisting of a hard drive, a browser, a secure module, and a virtual machine instance.

9. The method of claim 1 further comprising:
   prior to receiving the request from the client device by the user for sharing the PoK, authenticating, by the first RP server, that the user is permitted to access the first RP server.

10. The method of claim 1 further comprising:
    verifying, by the second RP server, that the shared PoK is acceptable for authentication; and
    in response to verifying that the shared PoK is acceptable for authentication, logging the user in to the second RP server.

11. The method of claim 1 further comprising:
    determining, by the second RP server, that a cognition test is needed to use the shared PoK for authentication;
    in response to determining that the cognition test is needed, causing the user to complete the cognition test; and
    in response to successful completion of the cognition test, accepting, by the second RP server, the shared PoK for authentication.

12. The method of claim 11 wherein determining that the cognition test is needed to use the shared PoK for authentication comprises determining that a previously accepted shared PoK has changed.

13. The method of claim 11 wherein determining that the cognition test is needed to use the shared PoK for authentication comprises determining that the cognition test is needed based on one or more requirements by the second RP server.

14. The method of claim 11 wherein causing the user to complete the cognition test comprises:
    requesting a login token from a Cognition Service, CS, server corresponding to the user;
    redirecting the user to the CS server including the login token; and
    receiving an authentication token from the client device.

15. The method of claim 14 wherein the CS server is chosen by the user.

16. A system comprising:
    a client device;
    a first Relying Party, RP, server; and
    a second RP server;
    wherein the first RP server is configured to:
      receive a request from the client device by a user for sharing a PoK; and
      cause the PoK to be provided to the client device; and
    the second RP server is configured to:
      authenticate, by the second RP server, that the user is permitted to access the second RP server, where authenticating that the user is permitted to access the second RP server comprises determining that the user is creating a user account at the second RP server;
      receive a request from the client device to use the shared PoK for authentication of the user.

* * * * *